Figure 1:
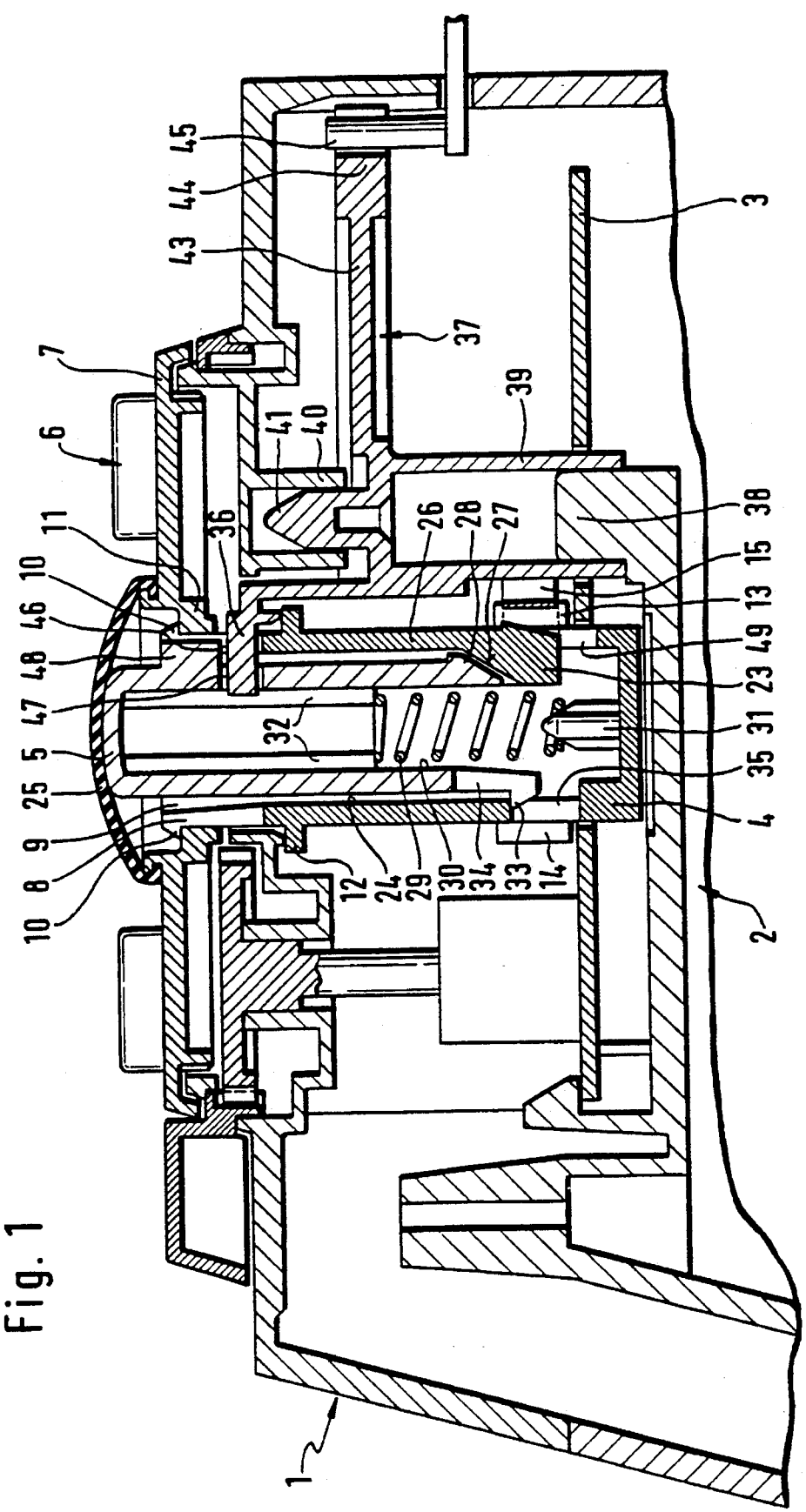

United States Patent
Börger et al.

[11] Patent Number: 5,550,343
[45] Date of Patent: Aug. 27, 1996

[54] SWITCH FOR ELECTRICALLY POWERED APPARATUS

[75] Inventors: Georg Börger, Steinbach; Karl-Heinz Kamprath, Wiesbaden, both of Germany

[73] Assignee: Braun Aktiengesellschaft, Frankfurt, Germany

[21] Appl. No.: 374,539

[22] PCT Filed: Jul. 14, 1993

[86] PCT No.: PCT/EP93/01843

§ 371 Date: Jan. 19, 1995

§ 102(e) Date: Jan. 19, 1995

[87] PCT Pub. No.: WO94/03912

PCT Pub. Date: Feb. 17, 1994

[30] Foreign Application Priority Data

Jul. 30, 1992 [DE] Germany .......... 42 25 153.2

[51] Int. Cl.⁶ ............................................. H01H 19/20
[52] U.S. Cl. ............ 200/569; 200/568; 200/567
[58] Field of Search .................... 200/564, 566, 200/567, 568, 569, 520, 527, 529, 11 R, 13, 14, 336, 28, 11 J, 527

[56] References Cited

U.S. PATENT DOCUMENTS

| | | |
|---|---|---|
| 3,032,618 | 5/1962 | Johnson ........................ 200/569 |
| 3,493,696 | 2/1970 | Rothweiler . |
| 4,227,058 | 10/1980 | Johnston et al. ............... 200/566 |

FOREIGN PATENT DOCUMENTS

| | | |
|---|---|---|
| 0071207 | 7/1982 | European Pat. Off. . |
| 1230890 | 4/1964 | Germany . |
| 6947257 | 12/1969 | Germany . |
| 0081874 | 10/1985 | Germany . |

*Primary Examiner*—David J. Walczak
*Attorney, Agent, or Firm*—Fish & Richardson P.C.

[57] ABSTRACT

The invention is directed to a switch (2) for electrically powered apparatus, in particular for domestic appliances, with a rotary actuating shaft (4) transmitting the switching operation from a rotary handle (5) to a switch contact (15, 16), the actuating shaft (4) including a longitudinal bore (24) in which an actuating rod (5) is axially movably disposed, an end of said rod being adapted to be urged into the actuating shaft (4) for a depth of some length in opposition to a restoring force and converting an axial motion into a radial switching operation of control cams (23) acting on the switch contacts (15, 16). This provides a convenient short-time operation in a simple manner.

11 Claims, 3 Drawing Sheets

SWITCH FOR ELECTRICALLY POWERED APPARATUS

This invention relates to a switch for electrically powered apparatus, in particular for domestic appliances, with a rotary actuating shaft transmitting the switching operation from a rotary handle to a switch contact, the actuating shaft including a longitudinal bore in which an actuating rod is axially movably disposed, an end of said rod being adapted to be urged into the actuating shaft for a depth of some length in opposition to a restoring force.

A switch of this type is already known from DE-U-69 47 257. In this switch, both the continuous-on mode (rotary switch) and the short-time mode (push button) require switch contacts separately disposed in the housing, the rotary switch being used for actuating a windshield wiper of an automotive vehicle, while the push button serves for short-time operation of a windshield washer pump.

Further, from EP 0 081 874 B1 a switch is known in which a variety of switching functions can be accomplished by turning the rotary handle to different settings. This is suitable for switching functions provided for continuous operation, because the operating mode set can be read from the position of the rotary handle. However, in a switching function provided for short-time operation in which the rotary handle must be held in the On position against the action of a restoring torque, the operation of a rotary handle is less convenient. Rather, push-button controls are preferred for effecting a short-time operation. In addition, the known switch is provided with an interlock system locking the rotary handle in the Off position until the lid of the domestic appliance is properly closed. The interlock system includes a two-armed lever which, by closing the lid, is pivotal into a position canceling the interlock, enabling the switch to be turned. When the drive motor of the appliance is turned on, the lever which is then locked in place holds the lid in its closed position, thus preventing the lid from being removed during operation of the domestic appliance.

It is an object of the present invention to provide a switch of the type initially referred to in which both the continuous-on switch and the short-time or pulse switch actuate the same switch contact. At the same time, the switch shall be of a straightforward construction, assemble readily, and afford low-cost manufacture.

According to the present invention, this object is accomplished in that a transmission element extends through a cutout in the wall of the actuating shaft surrounding the longitudinal bore, said transmission element converting an axial motion of the actuating rod into a switching operation that is transmitted to the switch contact.

Simply by depressing the actuating rod, the switch constructed in accordance with the present invention enables the electrical drive mechanism of the appliance to be turned on for the purpose of effecting a short-time operation, with the drive mechanism of the appliance being maintained in turned-on condition as long as the actuating rod is held depressed by the application of an external force. Other switching operations as continuous or intermittent operations or a reversal of the direction of rotation can be performed through the actuating shaft by means of the rotary handle in a proven manner. The switch configuration of the present invention has the advantage that the actuating rod allows the same switch contact to be actuated that is actuated by the rotation of the actuating shaft. This thus dispenses with the need for an additional switch contact for operating the drive mechanism of the appliance in the pulse mode.

To provide the transmission element, in a further proposal of the present invention the actuating shaft may include an elongate slot in which a resilient tongue is arranged whose radially movable end carries a control cam, with the actuating rod including a ramp inclined towards its longitudinal axis, the ramp enabling the control cam to move radially outwardly into engagement with the switch contact. This configuration affords ease of manufacture and allows conversion of the axial motion of the actuating rod into a radial control motion with little friction. In addition, the resilient tongue results in the generation of a restoring force returning the actuating rod to its initial position following actuation. To produce the restoring force, the added provision of a compression spring is possible which is seated between an abutment surface of the actuating rod and a step in the longitudinal bore of the actuating shaft.

According to the present invention, the actuating rod is readily lockable inside the longitudinal bore of the actuating shaft by providing on the outside of the actuating rod detent hooks adapted for locking engagement with cutouts provided in the wall of the actuating shaft and retaining the actuating rod in its neutral position in opposition to the restoring force of the compression spring. According to this invention, the actuating rod may be provided with a bore into which the compression spring extends. This allows a sufficiently long dimension of the compression spring in the presence of short axial overall lengths of actuating shaft and actuating rod.

To actuate the switch contact by means of the actuating shaft, a control cam is provided on the circumferential surface of the actuating shaft, the cam being movable into engagement with the switch contact by rotation of the actuating shaft. When it is desired to execute several switching operations with the actuating shaft, a corresponding number of control cams will be provided. The switch of the present invention may also be provided with an interlock system which ensures that the electric drive mechanism of the appliance can be set in operation when a safety device provided as, for example, the lid of the container of a juice extractor, is properly closed. To this end, the invention provides for the actuating shaft and the actuating rod to be lockable by a latch in their neutral position in which the drive mechanism of the appliance is turned off, and for the latch to be movable into an interlock deactivated position only by the closing of a safety device, in which position the actuating shaft and the actuating rod are freely movable for performing switching operations. To prevent the safety device from being opened with the drive mechanism turned on, the present invention may further provide for the latch to lock the safety device against opening in the interlock deactivated position. A simple configuration of an interlock switch may be accomplished according to this invention in that in the interlock activated position the latch radially engages relatively aligned openings in the actuating shaft and in the actuating rod, and that in the interlock deactivated position the openings are movable out of the range of motion of the latch by the actuating shaft or the actuating rod executing a switching operation, the actuating shaft or the actuating rod thus preventing the latch from returning to the interlock activated position. This provides a simple means of holding the latch in the interlock deactivated position when the drive mechanism of the appliance is turned on, thereby also protecting the safety device against being opened with the drive mechanism on.

According to the present invention, the latch may be formed by a two-armed rotary lever whose one arm carries a latch extending tangentially to the axis of rotation of the lever and engaging within the openings in the actuating shaft and the actuating rod, while its other lever arm carries at its end a bifurcated coupling member cooperating with a coupling pin of the safety device and embracing it in the interlock deactivated position.

In a further embodiment of the switch providing a tight seal and ease of cleaning, the rotary handle may include a dial having a central opening from which the end of the actuating rod protrudes, and the opening in the dial may be closed by an elastically deformable cap covering the end of the actuating rod.

Figure 2:
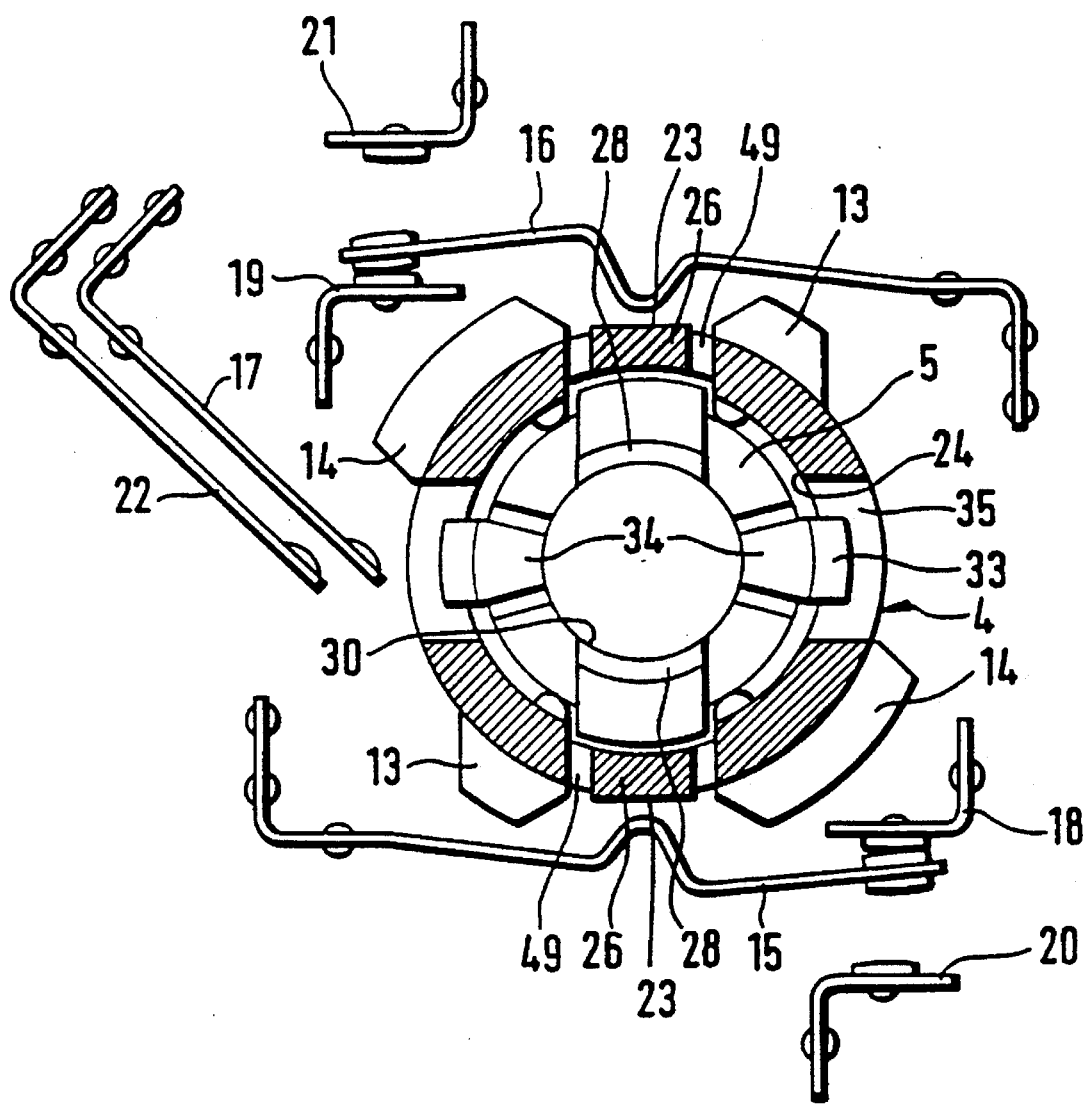
Figure 3:
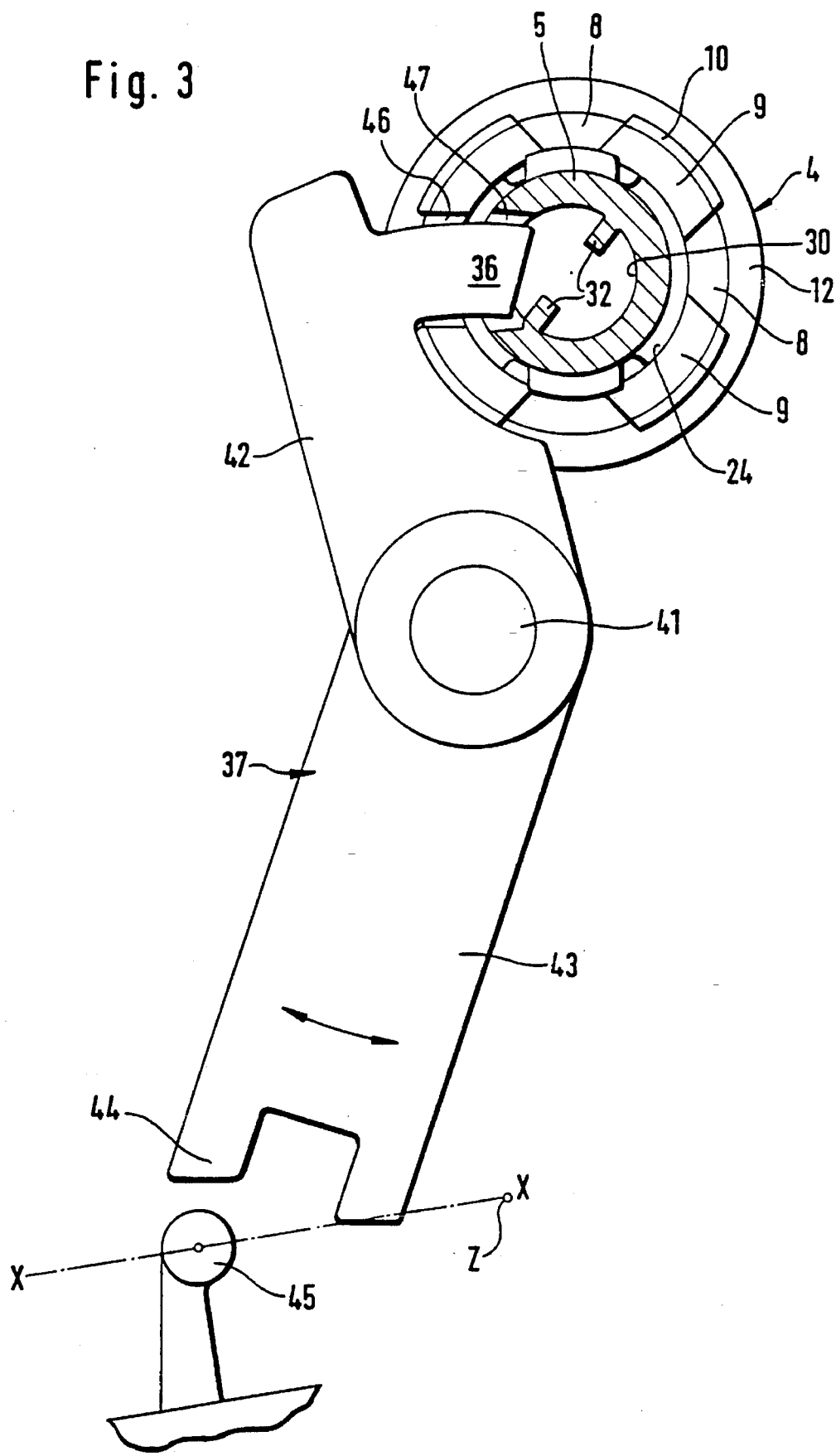

An embodiment of the present invention will now be described in more detail in the following with reference to the accompanying drawings. In the drawings, FIG. 1 is a longitudinal sectional view of a switch constructed in accordance with the present invention, the switch being mounted in the housing of the drive mechanism of a food processor;

FIG. 2 is a cross-sectional view of the actuating shaft, shown in combination with a representation of the switch contacts and the actuating rod of the switch of FIG. 1; and FIG. 3 is view of the actuating shaft in an axial direction, shown in combination with a cross-sectional view of the actuating shaft and the actuating rod and a view of the latch of the switch of FIG. 1.

In FIG. 1 of the drawings, there is shown a portion of the housing 1 of an electric drive mechanism of a kitchen apparatus for processing foods. The housing 1 accommodates a switch 2 comprising a board 3, an actuating shaft 4, an actuating rod 5, and a rotary handle 6 with a dial 7. Mounted on the board 3 are switch contacts which are actuatable by the actuating shaft 4 or the actuating rod 5, thereby turning the drive motor of the food processor on or off. The actuating shaft 4 is configured as a cylindrical bushing preferably manufactured from a hard plastics material. Several elongate slots 8 subdivide the fastening end of the actuating shaft 4 into individual segments 9 having at their free ends outwardly projecting hooks 10. The actuating shaft 4 has its segments 9 in locking engagement with the opening of an annular collar 11 of the dial 7, the hooks 10 embracing the annular collar 11 to thereby hold the dial 7 in position on the outside of the housing 1. Inside the housing 1, the actuating shaft 4 is carried in bores provided in the housing wall and in the board 3, being held axially outwardly by a collar 12 abutting the inside of the housing 1. To transmit the rotary force from the rotary handle 6 to the actuating shaft 4, the annular collar 11 has radially inwardly extending projections engaging within the elongate slots 8. In an outward direction, the fastening end of the actuating shaft 4 and the actuating rod 5 protruding therefrom are covered by an elastomeric cap 25 fastened to the dial 7.

As becomes apparent particularly from FIG. 2, immediately adjacent to the board 3 the actuating shaft 4 has on its outside four control cams 13, 14, whereof two control cams 13 and two control cams 14 are each symmetrically arranged relative to the axis of rotation of the actuating shaft 4. The control cams 13, 14 operate to move switch contacts 15, 16, 17 configured as resilient tongues. In the off position illustrated in FIG. 2, the switch contacts 15, 16 rest against a normally closed contact 18 and 19, respectively, while switch contact 17 is open. By rotating the actuating shaft 4 in a clockwise direction when viewing FIG. 2, only the switch contacts 15, 16 will be activated, causing them to be unseated from the normally closed contacts 18, 19 and to be urged into engagement with normally open contacts 20, 21. Rotation of the actuating shaft 4 in a counterclockwise direction will also activate the switch contact 17 in addition to the switch contacts 15, 16, causing the switch contact 17 to be urged against a mating contact 22 formed by a resilient tongue. The switch contacts 15, 16 are provided for actuation of the drive motor of the food processor, activating a braking circuit in their off position, and a driving circuit in their on position. Activation of the switch contact 17 activates an additional auto-pulse circuit which turns the drive motor on and off at predetermined intervals.

In order to be able to activate the switch contacts 15, 16 for the Pulse mode using a pushbutton-type control, the actuating shaft 4 includes between the fixed control cams 13, 14 radially movable control cams 23 which are movable into engagement with the switch contacts 15, 16 in a radial direction by means of the actuating rod 5 axially slidably disposed in the longitudinal bore 24 of the actuating shaft 4. The control cams 23 are provided at the free ends of resilient tongues 26 formed by wall sections of the actuating shaft 4 which are separated from the actuating shaft 4 at their longitudinal sides by elongate slots 49. The control cams 23 extend inwardly into the longitudinal bore 24, having on the inside inclined sliding surfaces 27 opposite to which correspondingly inclined ramps 28 are provided on the actuating rod 5. When the actuating rod 5 is pushed down into the longitudinal bore 24, the ramps 28 will urge the control cams 23 radially outwardly, their sliding surfaces 27 then sliding along the ramps 28. As this occurs, the outside of the control cams 23 will engage the switch contacts 15, 16, moving these into abutment with the normally open contacts 20, 21. This condition will be maintained only as long as an external force urges the actuating rod 5 into the actuating shaft 4 in opposition to a restoring force. The restoring force is composed of the spring forces of the switch contacts 15, 16, the resilient tongues 26, and the force of a compression spring 29 arranged in a bore 30 of the actuating rod 5 and bearing with its one end against the bottom of the actuating shaft 4 through a mandrel 31 and with its other end against the actuating rod 5 through stop ribs 32. In the off position, the position of the actuating rod 5 is determined by detent hooks 33 provided on resilient tongues 34 formed by the wall of the actuating rod 5 and engaging in cutouts 35 in the actuating shaft 4.

To prevent the switch 2 from being actuated when the container of-the food processor is open allowing access to the processing implement provided therein, a latch 36 is provided for locking the switch 2 in its neutral position in which the drive motor is turned off. The latch 36 is disposed on a two-armed lever 37 which is pivotal about an axis parallel to the actuating shaft 4. The bearing support is comprised of a pin 38 engaging within the bore of a bushing 39 connected to the lever 37, and of a bushing 40 embracing a bearing journal 41 on the lever 37. The latch 36 is fastened to the one arm 42 of the lever 37. The other arm 43 of the lever 37 has at its end a bifurcated coupling member 44 engaged by a pin 45 provided, for example, on the lid of the food processor container when the container is closed by the lid.

The latch 36 engages in a radial direction within relatively aligned openings 46, 47 provided in the actuating shaft 4 and in the actuating rod 5, thereby preventing the actuating shaft 4 from being rotated and the actuating rod 5 from being pressed down. As the container of the food processor is closed with its lid, the pin 45 is moved along the line X—X of FIG. 3 until it is at position Z. As this occurs, the pin 45 engages the bifurcated coupling member 44, pivoting the lever 37 in a counterclockwise direction until the latch 36 becomes disengaged from the openings 46, 47. This cancels the interlock of the actuating shaft 4 and the actuating rod 5, enabling the drive motor to be turned on either by a rotation of the actuating shaft 4 using the rotary handle 6 or, alternatively, by a depression of the actuating rod 5. When the actuating shaft 4 is rotated into a setting, the wall of the actuating shaft 4 moves in front of the end surface of the latch 36 instead of the opening 46, thus preventing the latch from returning to the interlock activated position. Thus, the lever 37 is locked in the position which it occupies with the lid completely closed. In this position, the bifurcated coupling member 44 embraces the pin 45 to an extent preventing the pin 45 from becoming disengaged from the bifurcated coupling member 44. As a result of the locked lever 37, the pin 45 is held fast in the closed position of the lid, opening of the lid being thus avoided. This reliably prevents the container from being opened inadvertently while the drive motor is turned on.

Locking of the lever 37 in the interlock deactivated position occurs also when the drive motor is operated in the pulse mode by depressing the actuating rod 5. For this purpose, the outside of the actuating rod 5 is provided with a rib structure 48 adjoining the opening 47, the rib structure being moved in front of the latch 36 disengaged from the two openings 46, 47 as the actuating rod 5 is pressed down, locking in this position the latch 36 and the lever 37.

We claim:

1. A switch for an electrically powered apparatus comprising a rotary handle structure, switch contact structure, a rotary actuating shaft structure connected to said rotary handle structure for transmitting a switching operation from said rotary handle structure to said switch contact structure to thereby actuate said contact structure upon rotation of said rotary handle structure, said actuating shaft structure including a longitudinal bore, an actuating rod axially movably disposed in said longitudinal bore, an end of said rod being adapted to be urged into the actuating shaft structure for a depth of some length in opposition to a restoring force structure, cutout structure in a wall of said actuating shaft structure surrounding said longitudinal bore and a transmission element extending through said cutout structure, said transmission element converting an axial motion of said actuating rod into a switching operation which actuates the same switch contact structure which can be actuated by said rotary actuating shaft structure.

2. The switch of claim 1 wherein said actuating shaft structure includes an elongate slot and a resilient tongue in said slot, said tongue having a radially movable end structure and a control cam on said end structure, said actuating rod including ramp structure inclined towards its longitudinal axis, said ramp structure enabling said control cam to move radially outwardly into engagement with said switch contact structure upon depression of said actuating rod.

3. The switch as claimed in any one of the preceding claims wherein said restoring force structure includes a compression spring seated between abutment surfaces of said actuating rod and said actuating shaft structure.

4. The switch of claim 3 wherein said actuating rod has a longitudinal bore into which said compression spring extends.

5. The switch of claim 1 wherein said actuating shaft structure has a circumferential surface, and a control cam is provided on said circumferential surface of said actuating shaft structure, said cam being movable into engagement with said switch contact structure by rotation of said actuating shaft structure.

6. The switch of claim 1 wherein said cutout structure is provided on said actuating shaft structure and said actuating rod has on an outside surface thereof detent hooks adapted for locking engagement with said cutout structure to thereby retain said actuating rod in a neutral position in opposition to said restoring force structure.

7. The switch of claim 1 and further including latch structure and a safety device, and wherein said actuating shaft structure and said actuating rod are lockable by said latch structure in a neutral position for which a drive mechanism of the apparatus is turned off, said latch structure being movable into an interlock deactivated position only by the closing of said safety device, wherein when said latch structure is in said deactivated position, said actuating shaft structure and said actuating rod are freely movable for performing switching motions.

8. The switch of claim 7 wherein said latch structure locks said safety device against opening in said interlock deactivated position of said switch.

9. The switch of either claim 7 or claim 8 wherein said actuating shaft structure and said actuating rod have openings that are movable into relatively aligned positions and in an interlock activated position, said latch structure radially engages said relatively aligned openings in said actuating shaft structure and in said actuating rod, and in the interlock deactivated position said openings are movable out of a range of motion of said latch structure by one of said actuating shaft structure and said actuating rod executing a switching operation, said one of said actuating shaft structure and said actuating rod thus preventing said latch structure from returning to the interlock activated position.

10. The switch of either claim 7 or claim 8 wherein said safety device includes a coupling pin and said latch structure includes a two-armed rotary lever whose one arm carries a latch portion extending tangentially to an axis of rotation of said lever, and whose other arm carries at its end a bifurcated coupling member cooperating with said coupling pin of said safety device and embracing said coupling pin in said interlock deactivated position.

11. The switch of claim 1 wherein said rotary handle structure includes a dial having a central opening from which an end of said actuating rod protrudes, and an elastically deformable cap closing said opening in said dial and covering the end of said actuating rod.

* * * * *

UNITED STATES PATENT AND TRADEMARK OFFICE
CERTIFICATE OF CORRECTION

PATENT NO. : 5,550,343

DATED : August 27, 1996

INVENTOR(S) : Börger, et al.

It is certified that error appears in the above-identified patent and that said Letters Patent is hereby corrected as shown below:

Col. 4, Line 40, delete "of-the" and replace with -- of the --

Col. 6, Line 11, delete "therefof" and replace with -- thereof --

Signed and Sealed this

Twenty-fifth Day of November, 1997

Attest:

Attesting Officer

BRUCE LEHMAN

Commissioner of Patents and Trademarks